United States Patent
Klug et al.

(10) Patent No.: US 10,131,861 B2
(45) Date of Patent: Nov. 20, 2018

(54) CORROSION-INHIBITING COMPOSITIONS

(71) Applicant: Clariant International Ltd., Muttenz (CH)

(72) Inventors: Peter Klug, Grossostheim (DE); Rainer Kupfer, Hattersheim (DE); Steffen Fleischer, Romrod (DE)

(73) Assignee: Clariant International Ltd., Muttenz (CH)

( * ) Notice: Subject to any disclaimer, the term of this patent is extended or adjusted under 35 U.S.C. 154(b) by 0 days.

(21) Appl. No.: 15/123,143

(22) PCT Filed: Feb. 26, 2015

(86) PCT No.: PCT/EP2015/000443
§ 371 (c)(1),
(2) Date: Sep. 1, 2016

(87) PCT Pub. No.: WO2015/131987
PCT Pub. Date: Sep. 11, 2015

(65) Prior Publication Data
US 2017/0218293 A1    Aug. 3, 2017

(30) Foreign Application Priority Data
Mar. 6, 2014 (DE) .................. 10 2014 003 215

(51) Int. Cl.
*C10M 141/06* (2006.01)
*C10M 133/08* (2006.01)
*C10M 133/16* (2006.01)

(52) U.S. Cl.
CPC ........ *C10M 141/06* (2013.01); *C10M 133/08* (2013.01); *C10M 133/16* (2013.01); *C10M 2203/003* (2013.01); *C10M 2203/022* (2013.01); *C10M 2203/024* (2013.01); *C10M 2207/022* (2013.01); *C10M 2207/126* (2013.01); *C10M 2207/18* (2013.01); *C10M 2207/2805* (2013.01); *C10M 2209/1033* (2013.01); *C10M 2215/042* (2013.01); *C10M 2215/082* (2013.01); *C10N 2230/04* (2013.01); *C10N 2230/12* (2013.01); *C10N 2230/16* (2013.01); *C10N 2240/40* (2013.01); *C10N 2250/02* (2013.01)

(58) Field of Classification Search
CPC ............. C10M 133/16; C10M 133/08; C10M 141/06; C10M 2203/003; C10M 2203/022; C10M 2203/024; C10M 2207/022; C10M 2207/126; C10M 2207/18; C10M 2207/2805; C10M 2209/1033; C10M 2215/042; C10M 2215/082; C10N 2230/04; C10N 2230/12; C10N 2230/16; C10N 2240/40; C10N 2250/02

USPC ........................................................ 508/158
See application file for complete search history.

(56) References Cited

U.S. PATENT DOCUMENTS

| 5,766,267 A | 6/1998 | Schumacher et al. |
| 7,297,666 B2 * | 11/2007 | Kupper .............. C10M 173/025 198/500 |

(Continued)

FOREIGN PATENT DOCUMENTS

| CN | 103468362 A | * 12/2013 |
| CN | 103468382 A | 12/2013 |
| EP | 0 550 637 | 7/1993 |
| EP | 0745719 | 12/1996 |
| WO | WO 92/06154 | 4/1992 |
| WO | WO 94/12609 | 9/1994 |
| WO | WO 95/23840 | 9/1995 |
| WO | WO 98/41601 | 9/1998 |
| WO | WO 00/65014 | 11/2000 |

OTHER PUBLICATIONS

U.S. Appl. No. 14/662,564.

(Continued)

*Primary Examiner* — James Goloboy
(74) *Attorney, Agent, or Firm* — Tod A. Waldrop

(57) ABSTRACT

The invention relates to a composition comprising a) at least one N-methyl-N-acylglucamine of formula (I), wherein $R^1$ represents a linear or branched, saturated or unsaturated hydrocarbon chain with 7 to 21 carbon atoms, one or more organic acids of formula (II) and/or the salts thereof, $R^2$—COOM, wherein $R^2$ represents a linear or branched alkyl group or a linear or branched mono- or poly-unsaturated alkenyl group with 5 to 29 carbon atoms, and M represents hydrogen or one or more cations, wherein the cations are present in charge-equalizing amounts, and c) one or more alkanolamines of formula (III), wherein $NR^1R^2R^3R^1$, $R^2$ and $R^3$ represent hydrogen, a linear or branched alkyl group with 1 to 4 carbon atoms, a cycloalkyl group with 5 to 7 carbon atoms, a linear or branched hydroxyalkyl group with 2 to 5 carbon atoms and 1 or 2 hydroxy groups or a hydroxyether group with 2 to 6 carbon atoms, with the provision that at least one of the groups is a hydroxyalkyl group or a hydroxyether group.

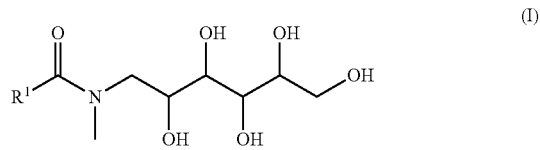

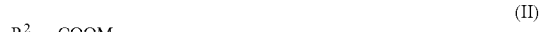

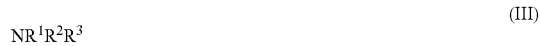

14 Claims, No Drawings

(56) References Cited

U.S. PATENT DOCUMENTS

| | | | |
|---|---|---|---|
| 2006/0142291 A1* | 6/2006 | Beilfuss | A01N 31/02 |
| | | | 514/241 |
| 2015/0125415 A1 | 5/2015 | Klug et al. | |
| 2015/0126424 A1 | 5/2015 | Klug et al. | |
| 2015/0126616 A1 | 5/2015 | Klug et al. | |
| 2015/0133560 A1 | 5/2015 | Klug et al. | |
| 2015/0140048 A1 | 5/2015 | Klug et al. | |
| 2015/0141466 A1 | 5/2015 | Klug et al. | |
| 2015/0141508 A1 | 5/2015 | Klug et al. | |
| 2015/0150767 A1 | 6/2015 | Klug et al. | |
| 2015/0164755 A1 | 6/2015 | Klug et al. | |
| 2015/0164756 A1 | 6/2015 | Klug et al. | |
| 2015/0320037 A1 | 11/2015 | Wacker | |
| 2016/0074310 A1 | 3/2016 | Klug et al. | |
| 2016/0136072 A1 | 5/2016 | Klug et al. | |
| 2016/0143828 A1 | 5/2016 | Klug et al. | |
| 2016/0243014 A1 | 8/2016 | Dahms et al. | |
| 2016/0272666 A1 | 9/2016 | Klug et al. | |
| 2016/0361243 A1 | 12/2016 | Klug et al. | |
| 2017/0000710 A1 | 1/2017 | Klug et al. | |
| 2017/0002297 A1 | 1/2017 | Klug et al. | |
| 2017/0044434 A1 | 2/2017 | Baur et al. | |
| 2017/0055524 A1 | 3/2017 | Baur et al. | |
| 2017/0071199 A1 | 3/2017 | Baur et al. | |
| 2017/0101606 A1 | 4/2017 | Klug et al. | |
| 2017/0265477 A1 | 9/2017 | Baur et al. | |
| 2017/0292062 A1 | 10/2017 | Wylde et al. | |
| 2017/0305838 A1 | 10/2017 | Appel et al. | |

OTHER PUBLICATIONS

U.S. Appl. No. 14/677,500.
U.S. Appl. No. 14/491,615.
U.S. Appl. No. 15/562,852.
International Search Report for PCT/EP2015/000443, dated Jun. 2, 2015.
International Preliminary Report on Patentability for PCT/EP2015/000443, dated Jan. 22, 2016.
Study on Synthesis and Properties of "Green" Surfactants—Glucamine derivates, Zhao Handong, Master Thesis, Southern Yangtze University, pp. 5-6, Jul. 25, 2007.
English Translation of Cited Excerpts of CN103468382A, Dec. 25, 2013.

* cited by examiner

CORROSION-INHIBITING COMPOSITIONS

The invention relates to compositions of N-methyl-N-acylglucamine, fatty acid, or salts thereof, and alkanolamine and the use thereof as corrosion inhibitor.

Compositions having a corrosion-inhibiting effect are being sought in different applications, for example for the production of aqueous metal treatment and metalworking fluids, especially of anticorrosive, detergent and cooling lubricant emulsions. Corrosion inhibitors are intended to protect metals, for example iron, aluminum, zinc, copper or alloys thereof, from corrosion during industrial steps of processing the metal parts and prevent formation of rust.

A multitude of inorganic and organic compounds are known as water-soluble corrosion inhibitors. Inorganic corrosion inhibitors may be based, for example, on chromates, nitrites or phosphates, but these are disadvantageous to a greater or lesser degree for toxicological and environmental reasons. Organic corrosion inhibitors are frequently based on carboxylates, amines, amides, or nitrogen-containing heterocyclic compounds.

Polyhydroxy fatty acid amides and the use thereof as nonionic surfactant in washing and cleaning compositions are described in numerous specifications.

WO 9412609 teaches washing and cleaning compositions comprising polyhydroxy fatty acid amide having good cleaning action, especially against greasy stains on textiles or ware.

WO 9841601 teaches cleaning compositions comprising polyhydroxy fatty acid amide, which remove greasy and oily soil on cooking utensils and are noncorrosive.

WO 9523840 teaches cleaning compositions comprising polyhydroxy fatty acid amide, which feature good color protection.

EP0745719 describes the use of carbohydrate compounds, including polyhydroxy fatty acid amides, as auxiliary for coloring or printing fiber materials with fiber-reactive dyes.

It was an object of the present invention to provide water-soluble corrosion inhibitors which are superior to the known corrosion inhibitors, particularly with regard to environmental compatibility, and exhibit very good corrosion-inhibiting action.

It has been found that, surprisingly, a composition comprising at least one N-methyl-N-acylglucamine, one or more organic acids and one or more alkanolamines exhibits significant corrosion-inhibiting action on metal surfaces and additionally features good environmental compatibility and safe use.

The invention therefore provides for a composition comprising
a) at least one N-methyl-N-acylglucamine of the formula (I)

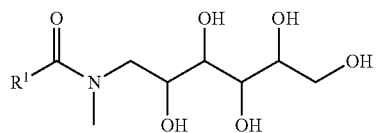

(I)

where $R^1$ is a linear or branched, saturated or unsaturated hydrocarbyl chain having 7 to 21 carbon atoms,
b) one or more organic acids of the formula (II), or salts thereof,

 (II)

where
$R^2$ is a linear or branched alkyl group or a linear or branched, mono- or polyunsaturated alkenyl group having 5 to 29 carbon atoms, and
M is hydrogen or one or more cations, where the cations are present in charge-balancing amounts,
and
c) one or more alkanolamines of the formula (III)

 (III)

where
$R^1$, $R^2$ and $R^3$ are hydrogen, a linear or branched alkyl group having 1 to 4 carbon atoms, a cycloalkyl group having 5 to 7 carbon atoms, a linear or branched hydroxyalkyl group having 2 to 5 carbon atoms and 1 or 2 hydroxyl groups or a hydroxy ether group having 2 to 6 carbon atoms, with the proviso that at least one of the radicals is a hydroxyalkyl group or a hydroxy ether group.

Further names for N-methyl-N-acylglucamine are N-methyl-N-1-deoxysorbitol fatty acid amide, N-acyl-N-methylglucamine, glucamide or N-methyl-N-alkylglucamide.

Preferably, M is an $Li^+$, $Na^+$, $K^+$, $Mg^{++}$, $Ca^{++}$, $Al^{+++}$, $NH_4^+$, monoalkylammonium, dialkylammonium, trialkylammonium and/or tetraalkylammonium ion. The alkyl substituents of the ammonium ions are each independently ($C_1$-$C_{22}$)-alkyl radicals which may optionally be endowed with up to 3 ($C_2$-$C_{10}$)-hydroxyalkyl groups.

The compositions of the invention are effective in protecting metal surfaces from corrosion, are surface-active, and have high water solubility which is indispensable for the formulation of aqueous concentrates for metal treatment and metalworking fluids.

The invention further provides for the use of the compositions of the invention for production of oily water-miscible emulsion concentrates which, through dilution with water, afford ready-to-use anticorrosive, detergent and cooling lubricant emulsions.

The invention further provides for the use of the composition of the invention as a constituent of anticorrosion compositions, detergents for metals and cooling lubricant emulsions.

The invention further provides a method of preventing or attenuating the formation of corrosion on metal surfaces, by contacting the metal surface with the composition of the invention.

In a preferred embodiment of the invention, $R^1$ is a linear or branched, saturated or unsaturated hydrocarbyl group having 11 to 17 carbon atoms. More particularly, $R^1$ is a linear or branched alkyl or alkenyl group. More preferably, $R^1$ is a linear saturated or unsaturated $C_{11}$, $C_{13}$, $C_{15}$ or $C_{17}$ radical, especially an unsaturated $C_{17}$ radical.

A particularly preferred embodiment of the invention is compositions comprising at least 2 to 6 different N-methyl-N-acylglucamines, where the 2 to 6 different N-methyl-N-acylglucamines have different acyl groups (—$COR^1$).

A particularly preferred embodiment of the invention is compositions in which at least 80% by weight of constituent a) is a mixture of N-methyl-N—$C_{12}$-acylglucamine and N-methyl-N—$C_{14}$-acylglucamine.

An equally particularly preferred embodiment of the invention is compositions in which at least 80% by weight of constituent a) is a mixture of N-methyl-N—$C_{16}$-acylglucamine and N-methyl-N—$C_{18}$-acylglucamine.

The N-acyl-N-methylglucamines of formula (I) can be prepared in the manner described in EP 0 550 637 from the corresponding fatty acid methyl esters and N-methylglucamine. The fatty acids of the fatty acid methyl esters are preferably selected from the group comprising 9-octadecenoic acid (oleic acid), octadeca-9,12-dienoic acid (linoleic acid), octanoic acid (caprylic acid), decanoic acid (capric acid), dodecanoic acid (lauric acid), tetradecanoic acid (myristic acid), hexadecanoic acid (palmitic acid), octadecanoic acid (stearic acid) and n-docosanoic acid (behenic acid).

In a further preferred embodiment of the invention, $R^2$ is a linear or branched, saturated alkyl group or a mono- or polyunsaturated alkenyl group having 7 to 21, especially having 11 to 17, carbon atoms.

Constituent b) is preferably selected from: caprylic acid, pelargonic acid, capric acid, lauric acid, myristic acid, palmitic acid, margaric acid, stearic acid, arachic acid, behenic acid, lignoceric acid, cerotic acid, montanic acid, melissic acid, undecylenoic acid, myristoleic acid, palmitoleic acid, petroselic acid, oleic acid, elaidic acid, vaccenic acid, gadoleic acid, eicosenoic acid, cetoleic acid (hydrogenated) erucic acid, nervonic acid, linoleic acid, α-linolenic acid, gamma-linolenic acid, calendic acid, punicinic acid, alpha-eleostearic acid, beta-eleostearic acid, arachidonic acid, eicosapentaenoic acid, clupanodonic acid, docosahexaenoic acid, vernolic acid, ricinoleic acid and salts thereof. Particular preference is given especially to fatty acids of coconut, palm kernel, olive and tall oil (TOFA) or tallow fat and salts thereof. Preference is given to using fatty acid salts in the form of $Li^+$, $Na^+$, $K^+$, $Mg^{++}$, $Ca^{++}$, $Al^{+++}$ and/or $NH_4^+$ salts. Preference is likewise given to the monoalkylammonium, dialkylammonium, trialkylammonium and/or tetraalkylammonium salts, where the alkyl substituents of the amines may each independently be ($C_1$-$C_{22}$)-alkyl radicals which may optionally be occupied by up to 3 ($C_2$-$C_{10}$)-hydroxyalkyl groups.

Particular preference is given to compositions comprising N-acyl-N-methylglucamines of the formula (I), a tall oil fatty acid (TOFA) and/or coconut fatty acid (CC) or salts thereof and at least one alkanolamine. Tall oil fatty acid (TOFA), as described in ROMPP (online ID=RD-20-00149), is a monocarboxylic acid of the formula (II) having predominantly mono-, di- and triunsaturated $C_{18}$ carbon chains. Coconut fatty acid is composed mainly of $C_8$-$C_{18}$ fatty acids, predominantly caprylic, lauric, capric, palmitic, stearic, myristic and oleic acid.

The alkanolamines which form constituent c) of the composition of the invention are preferably selected from monoethanolamine $HOCH_2CH_2NH_2$, diethanolamine $(HOCH_2CH_2)_2NH$, triethanolamine $(HOCH_2CH_2)_3N$, monoisopropanolamine $CH_3CHOHCH_2NH_2$, 2-amino-2-methyl-1-propanol $HOCH_2C(CH_3)_2NH_2$, 2-amino-1-butanol $CH_3CH_2CHNH_2CH_2OH$, diglycolamine $HOCH_2$—$CH_2OCH_2CH_2NH_2$, methylethanolamine $HOCH_2CH_2N(CH_3)H$, dimethylethanolamine $HOCH_2CH_2N(CH_3)_2$, methyldiethanolamine $(HOCH_2CH_2)_2NCH_3$, ethylaminoethanol $HOCH_2CH_2N(H)(CH_2CH_3)$, diethylaminoethanol $HOCH_2CH_2N(CH_2CH_3)_2$, 2-amino-2-ethylpropane-1,3-diol $HOCH_2C(C_2H_5)NH_2CH_2OH$, dimethylamino-2-propanol $CH_3CHOHCH_2N(CH_3)_2$, isopropylaminoethanol $HOCH_2CH_2N(H)(CH(CH_3)_2)$, isopropylaminodiethanol $(HOCH_2CH_2)_2N(CH(CH_3)_2)$, diisopropylaminoethanol $HOCH_2CH_2N(CH(CH_3)_2)_2$, n-butylaminoethanol $HOCH_2CH_2N(H)((CH_2)_3CH_3)$, dibutylaminoethanol $HOCH_2CH_2N(((CH_2)_3CH_3)_2$, n-butyldiethanolamine $(HOCH_2CH_2)_2N((CH_2)_3CH_3)_2$, t-butylethanol $HOCH_2CH_2NHCCH_3)_3$ and N-cyclohexyldiethanolamine $(HOCH_2CH_2)_2N(C_6H_{11})$.

More preferably, the compositions comprise at least one alkanolamine selected from monoethanolamine, diethanolamine, triethanolamine, diglycolamine, monoisopropanolamine and 2-amino-2-methyl-1-propanol and mixtures thereof.

Especially preferred compositions are those comprising
a) 1% to 50% by weight of one or more methylglucamines of the formula (I),
b) 0.1% to 23% by weight of at least one organic acid, or salt thereof, of formula (II) and
c) 0.05% to 42% by weight of at least one alkanolamine of formula (III).

Exceptionally preferred compositions are those comprising
a) 2% to 20% by weight of one or more methylglucamines of the formula (I),
b) 0.5% to 15% by weight of at least one organic acid, or salt thereof, of formula (II) and
c) 0.1% to 30% by weight of at least one alkanolamine.

In a further preferred embodiment, the above-specified composition comprises further components ad 100% by weight, as constituent d).

As further component(s) d), the compositions may preferably comprise one or more emulsifiers, one or more biocides, one or more further corrosion inhibitors, one or more AW additives, one or more EP additives, one or more defoamers, one or more antioxidants, one or more coupling agents, one or more alkali metals or alkaline earth metals, one or more solubilizers, pH regulators, and water.

The compositions preferably comprise emulsifiers selected from anionic, nonionic, cationic and amphoteric emulsifiers. Preferably, the compositions comprise anionic and/or nonionic emulsifiers.

Useful anionic emulsifiers include:
sulfonates, especially petroleumsulfonates, olefinsulfonates, i.e. mixtures of alkene- and hydroxyalkanesulfonates, and disulfonates as obtained, for example, from $C_{12}$-$C_{18}$-monoolefins having a terminal or internal double bond by sulfonation with gaseous sulfur trioxide and subsequent alkaline or acidic hydrolysis of the sulfonation products, $C_{12}$-$C_{18}$-alkanesulfonates, secondary alkanesulfonates, $C_9$-$C_{13}$-alkylbenzenesulfonates, α-naphthylsulfonates, and the esters of [α]-sulfo fatty acids (ester sulfonates), for example the [α]-sulfonated methyl esters of hydrogenated coconut, palm kernel or tallow fatty acids.

Sulfates, especially alk(en)yl sulfates, such as the alkali metal and especially the sodium salts of the sulfuric monoesters of $C_{12}$-$C_{18}$ fatty alcohols, for example of coconut fatty alcohol, tallow fatty alcohol, lauryl, myristyl, cetyl or stearyl alcohol, or of the $C_{10}$-$C_{20}$ oxo process alcohols, and also alk(en)yl ether sulfates, preferably the sulfuric monoesters of the straight-chain or branched $C_7$-$C_{21}$ alcohols ethoxylated with 1 to 6 mol of ethylene oxide, such as 2-methyl-branched $C_9$-$C_{11}$ alcohols.

Carboxylates, such as fatty acid soaps, especially the salts of lauric acid, myristic acid, palmitic acid, stearic acid, (hydrogenated) erucic acid and behenic acid, and especially soap mixtures derived from natural fatty acids, for example coconut, palm kernel, olive oil or tallow fatty acids. Naphthenic acid soaps.

Alkyl ether carboxylates of the formula (IV)

$$RO—(CH_2CH_2O—)_nCH_2—COOM \qquad (IV)$$

where
R is a linear or branched hydrocarbon group which is saturated or unsaturated by one or more double bonds and has 8 to 22 carbon atoms,
n is a number from 1 to 20, and
M is a counterion,
alkenylimidosuccinic acid carboxylate
fatty acid amides
phosphoric esters, alkoxylated phosphoric esters.

The anionic emulsifiers may be present in the form of their sodium, potassium or magnesium or ammonium salts.

The compositions may comprise one or more anionic emulsifiers in amounts of 0% by weight to 50% by weight, preferably 0.5% by weight to 40% by weight, more preferably 1.0% by weight to 30% by weight, based on the composition consisting of components a) to d).

Useful Nonionic Emulsifiers Include:
alkoxylated fatty alcohols, advantageously ethoxylated, especially primary alcohols having preferably 8 to 18 carbon atoms and an average of 1 to 12 mol of ethylene oxide (EO) per mole of alcohol, in which the alcohol residue may be linear or preferably 2-methyl-branched or linear and methyl-branched radicals in the G. The preferred ethoxylated alcohols include, for example, $C_{12}$-$C_{14}$ alcohols with 3 EO, 4 EO or 7 EO, $C_9$-$C_{11}$ alcohol with 7 EO, $C_{13}$-$C_{15}$ alcohols with 3 EO, 5 EO, 7 EO or 8 EO, $C_{12}$-$C_{18}$ alcohols with 3 EO, 5 EO or 7 EO and mixtures of these, such as mixtures of $C_{12}$-$C_{14}$ alcohol with 3 EO and $C_{12}$-$C_{18}$ alcohol with 7 EO mixture may contain, as typically present in oxo process alcohol radicals.

Methyl esters of alkoxylated $C_8$-$C_{22}$ fatty acids having 1 to 100 alkoxy groups, where the alkoxy groups may consist of one or different units selected from $CH_2CH_2O$, $C_3H_6O$ and $C_4H_8O$.

Fatty acid amides of the formula (V)

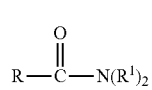

(V)

in which
R is an alkyl group having 7 to 21, preferably 9 to 17, carbon atoms and
each $R^1$ radical is hydrogen, $C_1$-$C_4$-alkyl, $C_1$-$C_4$-hydroxyalkyl or $(C_2H_4O)_xH$ where
x is 1, 2 or 3.

Preference is given to $C_8$-$C_{20}$ amides, monoethanolamides, diethanolamides and isopropanolamides.

Alkylphenol polyglycol ethers, preferably the condensation products of alkylphenols having a $C_6$- to $C_{20}$-alkyl group which may be linear or branched, with alkylene oxides.

Amine oxides of the formula (VI)

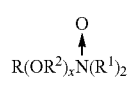

(VI)

in which
R is an alkyl, hydroxyalkyl or alkylphenol group having a chain length of 8 to 22 carbon atoms, $R^2$ is an alkylene or hydroxyalkylene group having 2 to 3 carbon atoms or mixtures thereof,
each $R^1$ radical is an alkyl or hydroxyalkyl group having 1 to 3 carbon atoms or a polyethylene oxide group having 1 to 3 ethylene oxide units and
x is a number from 0 to 10.

Alkyl polyglycosides of the formula (VII)

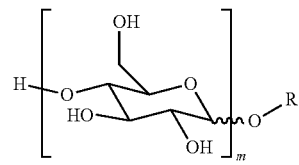

(VII)

where R is a primary straight-chain or methyl-branched, especially 2-methyl-branched, aliphatic radical having 8 to 22, preferably 12 to 18 carbon atoms, and m is 1 to 5.

The compositions may comprise one or more nonionic emulsifiers in amounts of 0% by weight to 50% by weight, preferably 0.5% by weight to 30% by weight, more preferably 1.0% by weight to 20% by weight, based on compositions consisting of components a) to d).

The compositions may comprise one or more anionic, nonionic, cationic and amphoteric emulsifiers in amounts of 0% by weight to 50% by weight, preferably 0.5% by weight to 40% by weight, more preferably 1.0% by weight to 35% by weight, based on the compositions consisting of components a) to d).

Aqueous metal treatment and metalworking fluids are an ideal habitat for microorganisms. In an aqueous medium, at favorable temperatures, an oversupply of nutrients is present. Uninhibited microbial growth leads to degradation of individual components, alters the pH and consequently destabilizes the emulsion. In addition, deposits of biological material can lead to shortening of the cooling lubricant service life in a bath. The effect of biocides is to kill off bacteria, yeasts and fungi.

A preferred embodiment of the invention is therefore compositions comprising N-methyl-N-acylglucamines of the formula (I), one or more fatty acids, or salts thereof, one or more alkanolamines and at least one or more than one biocide.

The biocides may be selected from:
N-(3-aminopropyl)-N-dodecylpropane-1,3-diamine, 1-aza-3,7-dioxa-5-ethylbicyclo[3.3.0]octane, 5-ethyl-3,7-dioxa-1-azabicyclo[3.3.0]octane 1,2-benzisothiazol-3(2H)-one (BIT)
benzyl alcohol mono(poly)hemiformal ((benzyloxy)methanol) biphenyl-2-ol (2-phenylphenol)
1,3-bis(hydroxymethyl)-5,5-dimethylimidazolidine-2,4-dione (1,3-dimethylol-5,5-dimethylhydantoin, DMDMH)
bismorpholinomethane, 4,4'-methylenebismorpholine
2-butylbenzo[d]isothiazol-3-one (BBIT)
cis-1-(3-chloroallyl)-3,5,7-triaza-1-azoniaadamantane chloride (cis-CTAC)
p-chloro-m-cresol (4-chloro-3-methylphenol, chlorocresol)
5-chloro-2-methyl-2,3-dihydroisothiazol-3-one/2-methyl-2,3-dihydroisothiazol-3-one (3(2H)-isothiazolone, 5-chloro-2-methyl, mixture with 2-methyl-3(2H)-isothiazolone) (CMI/MI, CMIT/MIT)
N-cyclohexylhydroxydiazene 1-oxide, potassium salt (N-cyclohexyl-N-nitroso-hydroxylamine, potassium salt, (N-cyclohexyldiazeniumdioxy)potassium, K-HDO)

2,2-dibromo-2-cyanacetamide (2,2-dibromo-3-nitrilopropionamide, DBNPA) 1,6-dihydroxy-2,5-dioxahexane ((ethylenedioxy)dimethanol)
4,4'-dimethyloxazolidine
1,3-dimethylol-5,5-dimethylhydantoin—see 1,3-bis(hydroxymethyl)-5,5-dimethylimidazolidine-2,4-dione
5-ethyl-3,7-dioxa-1-azabicyclo[3.3.0]octane (7a-ethyldihydro-1H,3H,5H-oxazolo-[3,4-c]-oxazole, 1-aza-3,7-dioxa-5-ethylbicyclo[3.3.0]octane) (EDHO)
(ethylenedioxy)dimethanol, 1,6-dihydroxy-2,5-dioxahexane
glutaraldehyde (glutaral)
(2,2',2"-(hexahydro-1,3,5-triazine-1,3,5-triyl)triethanol)—see 1,3,5-tris(2-hydroxyethyl)hexahydro-1,3,5-triazine
hexamethylenetetramine-3-chloroallyl chloride (methenamine-3-chloroallyl chloride, (1,3,5,7-tetraaza-1-(3-chloroprop-2-enyl)tricyclo[3.3.1.1]<3,7>decane chloride, CTAC
3-iodo-2-propynyl butyl carbamate (IPBC)
methenamine-3-chloroallyl chloride, hexamethylenetetramine-3-chlorallyl chloride
2-methyl-2,3-dihydroisothiazol-3-one (2-methyl-2H-isothiazol-3-one, MI, MIT)
3,3'-methylenebis(5-methyloxazolidine) (MBO)
4,4'-methylenebismorpholine (N,N'-methylenebismorpholine, methylenebis-(tetrahydro-1,4-oxazine), bismorpholinomethane)
sodium pyrithione, pyridine-2-thiol 1-oxide, sodium salt
2-n-octyl-2,3-dihydroisothiazol-3-one (2-octyl-2H-isothiazol-3-one) (OIT, "octhilinone")
4-(2-nitrobutyl)morpholine
2-phenoxyethanol
2-phenylphenol, biphenyl-2-ol
pyridine-2-thiol 1-oxide, sodium salt ("sodium pyrithione")
1,3,5,7-tetraaza-1-(3-chloroprop-2-enyl)tricyclo[3.3.1.1<3,7>]decane chloride, hexamethylenetetramine-3-chloroallyl chloride
1,3,4,6-tetra(hydroxymethyl)-[3aH,6aH]-1,3,4,6-tetraazabicyclooctane-2,5-dione (tetrahydro-1,3,4,6-tetrakis(hydroxymethyl)imidazo[4,5-d]imidazole-2,5(1H,3H)-dione, TMAD)
1,3,5-tris(2-hydroxyethyl)hexahydro-1,3,5-triazine (2,2',2"-(hexahydro-1,3,5-triazine-1,3,5-triyl)triethanol, HHT)
1,3,5-tris(2-hydroxypropyl)hexahydro-1,3,5-triazine (a,a',a"-trimethyl-1,3,5-triazine-1,3,5(2H,4H,6H)-triethanol)
6-acetoxy-2,4-dimethyl-m-dioxane-2,6-dimethyl-1,3-dioxan-4-yl acetate alkyl($C_{12}$-$C_{14}$)[(ethylphenyl)methyl]dimethylammonium chloride (stoichiometric)
N-alkyl($C_{10}$-$C_{16}$)trimethylenediamine and reaction products with chloroacetic acid
1-[2-(allyloxy)-2-(2,4-dichlorophenyl)ethyl]-1H-imidazole ("imazalil")
(+/−)1-[2-(β-allyloxy)-2-(2,4-dichlorophenyl)ethyl]-1H-imidazole ("technical grade imazalil")
aluminum sodium silicate-silver complex/silver zeolite
formic acid
Bardap 26, poly(oxy-1,2-ethanediyl)-a-[2-(didecylmethylammonium)ethyl]-w-hydroxypropionate
benzothiazole-2-thiol
(benzothiazol-2-ylthio)methyl thiocyanate ("TCMTB")
3-benzo(b)thien-2-yl-5,6-dihydro-1,4,2-oxathiazine 4-oxide ("bethoxazin")
benzylalkyl($C_{12}$-$C_{14}$)dimethylammonium chloride
benzylalkyl($C_{12}$-$C_{16}$)dimethylammonium chloride
benzylalkyl($C_{12}$-$C_{18}$)dimethylammonium chloride
benzylalkyl($C_{12}$-$C_{18}$ saturated and unsaturated, tallowalkyl, cocoalkyl, soyaalkyl)dimethylammonium chlorides, bromides or hydroxides
bethoxazin, 3-benzo(b)thien-2-yl-5,6-dihydro-1,4,2-oxathiazine 4-oxide
bis(3-aminopropyl)octylamine
1,3-bis(hydroxymethyl)urea (1,3-dimethylolurea)
1,3-bis(hydroxymethyl)urea, reaction products with 2-(2-butoxyethoxy)ethanol, ethylene glycol and formaldehyde ("formaldehyde depot alpha")
BKC, benzylalkyldimethylammonium chlorides, bromides or hydroxides
2-bromo-2-(bromomethyl)pentanedinitrile, 1,2-dibromo-2,4-dicyanobutane
4-bromo-2-(4-chlorophenyl)-1-(ethoxymethyl)-5-(trifluoromethyl)-1H-pyrrole-3-carbonitrile ("chlorfenapyr")
1,3-bromochloro-5,5-dimethylimidazolidine-2,4-dione (bromochloro-5,5-dimethylhydantoin)
2-bromo-2-nitropropane-1,3-diol ("bronopol")
(2-bromo-2-nitrovinyl)benzene
2-tert-butylaminoethyl methacrylate, homopolymer
cis-4-[3-(p-tert-butylphenyl)-2-methylpropyl]-2,6-dimethylmorpholine ("fenpropimorph")
carbendazim, 2-(methoxycarbonylamino)benzimidazole
[2-[[2-[(2-carboxyethyl)(2-hydroxyethyl)amino]ethyl]amino]-2-oxoethyl]cocoalkyl-dimethylammonium hydroxides, internal salts (quaternary ammonium compounds)
2-chloroacetamide
3-(3-chloro-4-methylphenyl)-1,1-dimethylurea ("chlortoluron")
chlorfenapyr, 4-bromo-2-(4-chlorophenyl)-1-(ethoxymethyl)-5-(trifluoromethyl)-1H-pyrrole-3-carbonitrile
DDAC, dialkyldimethylammonium chlorides, bromides or methylsulfates
dialkyl($C_8$-$C_{10}$)dimethylammonium chlorides
dialkyl($C_6$-$C_{18}$ saturated and unsaturated, tallowalkyl, cocoalkyl, soyaalkyl)-dimethylammonium chlorides, bromides or methylsulfates (DDAC)
1,2-dibromo-2,4-dicyanobutane (2-bromo-2-(bromomethyl)pentanedinitrile)
2,4-dichlorobenzyl alcohol (2,4-dichlorophenylmethanol)
dichlorophene, 2,2'-methylenebis(4-chlorophenol)phenol
1-[[2-(2,4-dichlorophenyl)-4-propyl-1,3-dioxolan-2-yl]methyl]-1H-1,2,4-triazole ("propiconazole")
didecyldimethylammonium chloride
N-didecyl-N-dipolyethoxyammonium borate/didecylpolyoxyethylammonium borate
(CAS: boric acid, polymer with N-decyl-1-decanamine, oxirane (ethylene oxide) and propane-1,2-diol)
1,3-didecyl-2-methyl-1H-imidazolium chloride
p-[di(iodomethyl)sulfonyl]toluene
$N^2$,$N^4$-diisopropyl-6-methylthio-1,3,5-triazine-2,4-diamine ("prometryn")
dipotassium disulfite
2,6-dimethyl-1,3-dioxan-4-ylacetate (6-acetoxy-2,4-dimethyl-m-dioxane)
1,3-dimethylolurea, 1,3-bis(hydroxymethyl)urea
disodium disulfite
disodium ethylenebis(dithiocarbamate) ("nabam")
disodium octaborate tetrahydrate
2,2'-dithiobis[N-methylbenzamide]
fenpropimorph, cis-4-[3-(p-tert-butylphenyl)-2-methylpropyl]-2,6-dimethylmorpholine
fluometuron-1,1-dimethyl-3-(3-trifluoromethylphenyl)urea
boric acid
formaldehyde
formaldehyde depot alpha, 1,3-bis(hydroxymethyl)urea, reaction products with 2-(2-butoxyethoxy)ethanol, ethylene glycol and formaldehyde
5-hydroxymethoxymethyl-1-aza-3,7-dioxabicyclo[3.3.0]octane (16.0%)/5-hydroxymethyl-1-aza-3,7-dioxabicyclo[3.3.0]octane (28.8%)/5-hydroxy-poly(methyleneoxy)methyl-1-aza-3,7-dioxabicyclo[3.3.0]octane (5.2%)/water (50%) mixture
2-(hydroxymethyl)-2-nitropropane-1,3-diol (nitromethylidinetrimethanol, "Tris Nitro")
1-hydroxy-2(1H)-pyridinone (hydroxy-2-pyridone)
imizalil, 1-[(2-allyloxy)-2-(2,4-dichlorophenyl)ethyl]-1H-imidazole
technical grade imazalil, (+/−)-1-[2-(β-allyloxy)-2-(2,4-dichlorophenylethyl]-1H-imidazole
3-(4-isopropylphenyl)-1,1-dimethylurea ("isoproturon")
potassium 2-biphenoxide (potassium o-phenylphenoxide)
potassium dimethyldithiocarbamate
potassium sulfite
lignin
metam-sodium, sodium methyldithiocarbamate
2-(methoxycarbonylamino)benzimidazole (methyl benzimidazol-2-yl carbamate, "carbendazim")
2,2'-methylenebis(4-chlorophenol)phenol ("dichlorophen")
methylene dithiocyanate
L(+)-lactic acid
naba, disodium ethylenebis(dithiocarbamate)
sodium 2-biphenoxide (sodium o-phenylphenoxide)
sodium bromide
sodium p-chloro-m-cresoxide
sodium dimethyldithiocarbamate
sodium hydrogen-2,2'-methylenebis[4-chlorophenoxide]
sodium hydrogensulfite
sodium methyldithiocarbamate ("metam-sodium")
sodium o-phenylphenoxide, sodium 2-biphenoxide
sodium sulfite
nitromethylidinetrimethanol, 2-(hydroxymethyl)-2-nitro-1,3-propanediol
oligo(2-(2-ethoxy)ethoxyethylguanidium chloride)
1-phenoxy-2-propanol/2-phenoxypropanol mixture
phthalaldehyde
poly(hexamethylenediamineguanidinium chloride)
poly(oxy-1,2-ethanediyl)-a-[2-(didecylmethylammonium)ethyl]-w-hydroxypropanoate ("Bardap 26")
prometryn, $N^2,N^4$-diisopropyl-6-methylthio-1,3,5-triazine-2,4-diamine
2-propanediol, polymer with boric acid, N-decyl-1-decanamine and ethylene oxide (oxirane)—see N-didecyl-N-dipolyethoxyammonium borate/didecylpolyoxyethylammonium borate
2-propenal-propane-1,2-diol copolymer
propiconazole, 1-[[2-(2,4-dichlorophenyl)-4-propyl-1,3-dioxolan-2-yl]methyl]1H-1,2,4-triazole
pyridine-2-thiol 1-oxide, zinc salt ("zinc pyrithione", "pyrithione-zinc")
sulfur dioxide
silver chloride
TCMTB, (benzothiazol-2-ylthio)methyl thiocyanate
N,N,N',N'-tetramethylethylenediamine-bis(2-chloroethyl) ether copolymer
(N,N,N',N'-tetramethyl-1,2-ethanediamine, polymer with 1,1'-oxybis(2-chloroethane))
2-(thiazol-4-yl)benzimidazole ("thiabendazole")
Tris Nitro, 2-(hydroxymethyl)-2-nitropropane-1,3-diol
zinc pyrithione, pyridine-2-thiol 1-oxide, zinc salt A preferred embodiment of the invention is compositions containing one or more biocides selected from the group of boric acid, 1,2-benzisothiazol-3-(2H)-one (BIT), 3(2H)-isothiazolone, 2-methyl, methanol [1,2-ethanediylbis(oxy)bis(glyoxal monoethylene acetal)], sodium 2-pyridinethione-1-oxide (sodium pyrithione), 1,3,5-triazine-1,3,5(2H,4H,6H)-triethanol, morpholine, 4,4'-methylenebis(1H,3H,5H) oxazolo[3,4-c]oxazole, 5-ethyl-3,7-dioxa-1-azabicyclo-[3.3.0]octane, 3-iodo-2-propynyl butyl carbamate (IPBC).

The concentration of the one or more biocides in the compositions is preferably 0.001% to 5.0% by weight, based on the ready-to-use compositions, for example based on a metalworking fluid.

The compositions may, in addition to the N-methyl-N-acylglucamines of the formula (I) used as corrosion inhibitor in accordance with the invention, comprise further corrosion inhibitors, for example organic acids and salts thereof, especially alkali metal soaps, sulfonates, amines, the anhydrides and salts thereof, benzoic acid derivatives and boron compounds.

The compositions may contain one or more additional corrosion inhibitors in amounts of 0% by weight to 10% by weight, based on the ready-to-use compositions, for example based on a metalworking fluid.

Preferably, the compositions comprise wear reducers, called AW additives, which are bound to the metal surface by adsorption and chemisorption processes and prevent metal abrasion. AW additives are zinc and phosphorus compounds, preferably zinc dithiophosphate, zinc dialkyldithiophosphate, tricresyl phosphate, chlorinated paraffins, glycerol monooleate, fatty acids and salts thereof, preferably stearic acid, dialkyl hydrogenphosphites, for example dilauryl hydrogenphosphites, commercially available as Duraphos® AP-230, trialkyl phosphites, for example trilauryl phosphite, commercially available as Duraphos® TLP.

For uses at high pressures, AW additives are ineffective and require the use of extreme pressure additives (EP additives).

EP additives used are usually sulfur and phosphorus compounds. The problematic chlorine compounds are barely still in use, if at all. Sulfur-containing additives, in the case of ferrous materials, form iron sulfide layers at the metal surface after prior adsorption and chemisorption.

Suitable examples are disulfides (inactive sulfur carriers—odorless), polysulfides, sulfurized olefins, sulfurized fatty acid esters and phosphoric esters, sulfonated olefins, zinc diphenylsulfide, methyl trichlorostearate, chlorinated naphthalene, fluoroalkylpolysiloxanes, neutralized or partly neutralized phosphates and dithiophosphates.

The compositions may comprise one or more EP additives in amounts of 0% by weight to 1% by weight, preferably 0.0005% by weight to 0.5% by weight, more preferably 0.005% by weight to 0.05% by weight, based on the ready-to-use compositions, for example based on a metalworking fluid.

In addition, the compositions may comprise defoamers, for example silicones, especially dimethylsilicone polymers, and silicic esters and alkyl methacrylates.

To improve service life, the compositions may comprise antioxidants, for example phenol derivatives such as 4,4'-methylenebis(2,6-di-tert-butylphenol), 4,4'-bis(2,6-di-tert-butylphenol), 4,4'-bis(2-methyl-6-tert-butylphenol), 2,2'-methylenebis(4-methyl-6-tert-butylphenol), 4,4'-butylidenebis(3-methyl-6-tert-butylphenol), 4,4'-isopropylidenebis(2,6-di-tert-butylphenol), 2,2'-methylenebis(4-methyl-6-nonylphenol), 2,2'-isobutylidenebis(4,6-dimethylphenol), 2,2'-5-methylenebis(4-methyl-6-cyclohexylphenol), 2,6-di-tert-butyl-4-methylphenol, 2,6-di-tert-butyl-4-ethylphenol, 2,4-dimethyl-6-tert-butylphenol, 2,6-di-tert-1-dimethylaminop-cresol, 2,6-di-tert-4-(N,N'-dimethylaminomethylphenol), 4,4'-thiobis(2-methyl-6-tert-butylphenol), 2,2'-thiobis(4-methyl-6-tert-butylphenol), bis(3-methyl-4-hydroxy-5-tert-10-butylbenzyl) sulfide, and bis(3,5-di-tert-butyl-4-hydroxybenzyl), diphenylamine derivatives such as alkylated diphenylamines, phenyl-α-naphthylamine and alkylated α-naphthylamines. Likewise suitable are metal dithiocarbamates, especially zinc dithiocarbamate and 15-methylenebis(dibutyldithiocarbamate).

The compositions may comprise one or more antioxidants in amounts of 0% by weight to 1% by weight, preferably 0.0005% by weight to 0.5% by weight, more preferably 0.005% by weight to 0.05% by weight, based on the ready-to-use compositions, for example based on a metalworking fluid.

The compositions may comprise what are called coupling agents which boost the emulsifying action of the emulsifiers used. Preference is given to sulfonates, especially lignosulfonate, petroleumsulfonate, dodecylbenzylsulfonate, sodium salt, and sulfates, for example laurylsulfate, sodium salt.

The compositions may comprise one or more coupling agents in amounts of 0% by weight to 10% by weight, preferably 0.005% by weight to 5% by weight, more preferably 0.5% by weight to 3% by weight, based on the ready-to-use compositions, for example based on a metalworking fluid.

The compositions may additionally comprise alkali metal or alkaline earth metal salts, for example sodium carbonate, sodium hydrogencarbonate or calcium carbonate.

The compositions may comprise one or more alkali metal or alkaline earth metal salts in amounts of 0% by weight to 5% by weight, preferably 0.005% by weight to 1% by weight, more preferably 0.05% by weight to 0.8% by weight, based on the ready-to-use compositions, for example based on a metalworking fluid.

The compositions may comprise solubilizers, for example alcohols, glycols, especially butyl diglycol, propylene glycol, glycerol or sodium cumenesulfonate, in amounts of 0% by weight to 6% by weight, preferably 0.05% by weight to 5% by weight, more preferably 0.5% by weight to 4% by weight, based on the ready-to-use compositions, for example based on a metalworking fluid.

The pH of the compositions of the invention should be in the range from 7 to 12, preferably from 8 to 11.

The abovementioned compositions comprising a) to d) may be presented as a "performance packaging".

For the production of metal treatment and metalworking fluids, in one embodiment, 5% to 40% by weight, preferably 10% to 30% by weight, more preferably 15% to 25% by weight, of the "performance packaging" are mixed with one or more oils in the amounts of 60% to 95% by weight, preferably 70% to 90% by weight, more preferably 75% to 85% by weight, based on the finished mixture of the abovementioned composition and the one or more oils. The mixtures thus obtained are referred to by the person skilled in the art as emulsion concentrates. These emulsion concentrates are diluted by the user, preferably in a volume ratio of one part emulsion concentrate to 10 to 50 parts water, and used, for example, as metal treatment and metalworking fluid.

Because of the self-emulsifying properties of the emulsion concentrates, the ready-to-use emulsions, for example metal treatment and metalworking fluids, when admixed with water, form spontaneously or after slight mechanical agitation, for example stirring. This emulsion can be used, for example, as a cleaning, anticorrosive or cooling lubricant emulsion in metalworking.

The invention therefore further provides for the use of the compositions of the invention composed of components a) to c) or a) to d) for the production of emulsion concentrates, by mixing 5% to 40% by weight, preferably 10% to 30% by weight, more preferably 15% to 25% by weight, of the composition of the invention composed of components a) to c) or a) to d) with one or more oils in an amount of 60% to 95% by weight, preferably 70% to 90% by weight, more preferably 75% to 85% by weight, based on the total amount comprising the inventive composition of components a) to c) or a) to d) and the one or more oils.

In a likewise preferred embodiment, 40% to 70% by weight, preferably 45% to 60% by weight, more preferably 50% to 55% by weight of the abovementioned inventive composition (performance packaging) comprising components a) to c) or a) to d) is mixed with one or more oils in the amounts of 30% to 60% by weight, preferably 40% to 55% by weight, more preferably 45% to 50% by weight, based on the finished mixture of the abovementioned composition and the one or more oils.

Useful oils as the one or more oils include mineral oils, especially mineral oils having kinematic viscosities of 5 to 1000, preferably 10 to 100 and exceptionally preferably 5 to 50 mm$^2$/s, measured at 40° C., paraffins, isoparaffins, cycloparaffins (naphthenes, saturated cyclic hydrocarbons), aromatic hydrocarbons, synthetic oils, such as poly-alpha-olefins, polyalkylene glycols (PAG) and ester oils.

Preferred ester oils are:

esters of monohydric alcohols, for example n-butyl laurate, n-butyl palmitate/stearate, n-butyl palmitate/stearate, cetylstearyl i-nonanoate, decyl oleate, 2-ethylhexyl coconut fatty acid ester, 2-ethylhexyl oleate, 2-ethylhexyl palmitate/stearate, 2-ethylhexyl tallow fatty acid ester, 2-hexyldecyl palmitate/stearate, n-hexyl laurate, i-butyl oleate, i-butyl palmitate/stearate, i-butyl tallow fatty acid ester, i-butyl mixed fatty acid ester, i-nonyl palmitate/stearate, i-propyl myristate, i-propyl palmitate, i-propyl palmitate/stearate, i-tridecyl palmitate/stearate, coconut fatty alcohol palmitate/stearate, n-octyl caprylate, oleyl erucate, oleyl oleate, cetylstearyl palmitate/stearate, cetylstearyl behenate, glycerol esters, for example glycerol dioleate, glycerol dipalmitate/-stearate, glycerol diesters, glycerol monobehenate, glycerol monomyristate, glycerol monooleate, glycerol monoricinoleate, glycerol mono-tallow fatty acid ester, glycerol tri-fatty acid ester, glycerol trihydrostearate, glycerol trioleate, glycerol tristearate, polyol esters, for example pentaerythritol tetracaprinate/-caprylate, pentaerythritol dioleate, pentaerythritol tetraoleate, pentaerythritol palmitate/stearate, polyol caprinate/caprylate, trimethylolpropane tri-fatty acid esters, glycol esters, for example ethylene glycol monopalmitate/-stearate, ethylene glycol dipalmitate/-stearate, polyglycol esters, polyglycol oleates, propylene glycol caprinate/caprylate, propylene glycol oleates, triethylene glycol dipalmitate/-stearate, triethylene glycol dicaprinate/-caprylate, dicarboxylic esters, for example di-n-butyl adipate, di-n-butyl sebacate, di-n-ethylhexyl sebacate, dioctyl adipate, dicetylstearyl phthalate, oleyl stearyl phthalate, polyol partial esters, for example propylene glycol caprinate/caprylate, propylene glycol oleates, triethylene glycol dipalmitate/-stearate, triethylene glycol dicaprinate/-caprylate.

EXAMPLES

All percentages, unless stated otherwise, should be understood to mean percent by weight (% by weight).

Determination of the corrosion-inhibiting effect of a mixture of N-methyl-N—$C_{12}$-acylglucamine and N-methyl-N—$C_{14}$-acylglucamine (Glu1) and a mixture of N-methyl-N—$C_{16}$-acylglucamine and N-methyl-N—$C_{18}$-acylglucamine (Glu2) in the presence of tall oil fatty acid (TOFA), coconut fatty acid (CC) and mono- or di- or triethanolamine on iron.

A corrosion protection test is conducted in accordance with DIN 51360-2, in which gray iron turnings (GG25 type) on a round filter were wetted with in each case 2% solutions of test formulations 1 to 9 according to table 1 in water having 20 German degrees of hardness (20° dH) for 2 hours each, and the corrosion residues formed on the filter paper were assessed.

Corrosion is assessed in accordance with DIN 51 360-2 as follows:

0 no corrosion/unchanged
1 traces of corrosion/not more than 3 corrosion marks
2 slight corrosion/not more than 1% of the surface discolored
3 moderate corrosion/not more than 5% of the surface discolored
4 severe corrosion/more than 5% of the surface discolored

TABLE 1

Test formulations:

| Component [% by weight] | Example | | | | | | | | |
|---|---|---|---|---|---|---|---|---|---|
| | 1(C) | 2 | 3(C) | 4 | 5(C) | 6 | 7(C) | 8 | 9(C) |
| Glu1 | 0 | 0 | 0 | 0 | 0 | 0 | 0 | 64 | 0 |
| Glu2 | 100 | 64 | 0 | 64 | 0 | 64 | 0 | 0 | 0 |
| CC | 0 | 0 | 0 | 0 | 0 | 0 | 0 | 15 | 15 |
| TOFA | 0 | 15 | 15 | 15 | 15 | 15 | 15 | 0 | 0 |
| Monoethanolamine | 0 | 21 | 21 | 0 | 0 | 0 | 0 | 0 | 0 |
| Diethanolamine | 0 | 0 | 0 | 21 | 21 | 0 | 0 | 0 | 0 |
| Triethanolamine | 0 | 0 | 0 | 0 | 0 | 21 | 21 | 21 | 21 |
| Propylene glycol | 0 | 0 | 12.8 | 0 | 12.8 | 0 | 12.8 | 0 | 0 |
| Glycerol | 0 | 0 | 3.5 | 0 | 3.5 | 0 | 3.5 | 0 | 0 |
| Water | 0 | 0 | 47.7 | 0 | 47.7 | 0 | 47.7 | 0 | 64 |
| Corrosion assessment | 2-3 | 0 | 1-2 | 0 | 1-2 | 0 | 2 | 0 | 2 |

Determination of the corrosion-inhibiting action (Glu2) in the presence of tall oil fatty acid and mono- or di- or triethanolamine on aluminum.

A corrosion protection test is conducted in accordance with EEH1020-AA-1049 with the aluminum alloys AlZnMgCu1.5 and AlMgSi1. 2% test formulations from table 1 were each prepared with water having 20 German degrees of hardness (20° dH), and the test specimens of the abovementioned alloys were each half-immersed in the solutions at 40° C. and left therein for 24 hours. Thereafter, the test specimens are pulled out of the solutions, rinsed with demineralized water and then acetone, and dried. Both the part immersed into the solution (solution) and the exposed part (atmosphere) of the test specimens are assessed according to the criteria mentioned above for DIN 51 360.

TABLE 2

Test formulations:

| Component [% by weight] | Example | | | | | |
|---|---|---|---|---|---|---|
| | 10 | 11(C) | 12 | 13(C) | 14 | 15(C) |
| Glu2 | 64 | 0 | 64 | 0 | 64 | 0 |
| TOFA | 15 | 15 | 15 | 15 | 15 | 15 |
| Monoethanolamine | 21 | 21 | 0 | 0 | 0 | 0 |
| Diethanolamine | 0 | 0 | 21 | 21 | 0 | 0 |
| Triethanolamine | 0 | 0 | 0 | 0 | 21 | 21 |
| Propylene glycol | 0 | 12.8 | 0 | 12.8 | 0 | 12.8 |
| Glycerol | 0 | 3.5 | 0 | 3.5 | 0 | 3.5 |
| Water | 0 | 47.7 | 0 | 47.7 | 0 | 47.7 |

The results are summarized in table 3.

TABLE 3

Corrosion of aluminum alloys in the presence of a mixture of N-methyl-N-acylglucamine (Glu2), fatty acid and alkanolamines (test formulation 10, 12 and 14) compared to fatty acid and alkanolamines without N-methyl-N-acylglucamine (test formulations 11, 13 and 15)

| Alloy | Example | | | | | |
|---|---|---|---|---|---|---|
| | 10 | 11(0) | 12 | 13(0) | 14 | 15(0) |
| AlZnMgCu1.5, atmosphere | 1 | 3 | 0 | 1-2 | 0 | 1 |
| AlZnMgCu1.5 solution | 0 | 0 | 0 | 1 | 0 | 0 |
| AlMgSi1 atmosphere | 0-1 | 3 | 0-1 | 2 | 0-1 | 2 |
| AlMgSi1 solution | 0 | 0 | 0 | 0 | 0 | 0 |

The invention claimed is:

1. An emulsion concentrate containing 5% to 40% by weight of a composition comprising a) at least one N-methyl-N-acylglucamine of the formula (I)

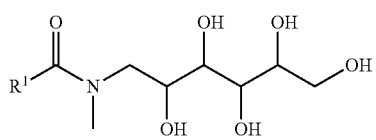

where $R^1$ is a linear or branched, saturated or unsaturated hydrocarbyl chain having 7 to 21 carbon atoms, b) at least one organic acid selected from the group consisting of tall oil fatty acids, rapeseed oil fatty acids, soya oil fatty acids, salts thereof and mixtures thereof, and c) at least one alkanolamine of the formula (III)

where $R^1$, $R^2$ and $R^3$ are hydrogen, a linear or branched alkyl group having 1 to 4 carbon atoms, a cycloalkyl group having 5 to 7 carbon atoms, a linear or branched hydroxyalkyl group having 2 to 5 carbon atoms and 1 or 2 hydroxyl groups or a hydroxy ether group having 2 to 6 carbon atoms, with the proviso that at least one of the radicals is a hydroxyalkyl group or a hydroxy ether group, and
60 to 95% by weight of at least one oil.

2. The emulsion concentrate as claimed in claim 1, comprising at least one N-methyl-N-acylglucamine of the formula (I) where $R^1$ is a linear or branched, saturated or unsaturated hydrocarbyl chain having 11 to 17 carbon atoms.

3. The emulsion concentrate as claimed in claim 1, in which the compound of the formula (I) is a mixture of N-methyl-N—$C_{12}$-acylglucamine and N-methyl-N—$C_{14}$-acylglucamine.

4. The emulsion concentrate as claimed in claim 1, in which the compound of the formula (I) is a mixture of N-methyl-N—$C_{16}$-acylglucamine and N-methyl-N—$C_{18}$-acylglucamine.

5. The emulsion concentrate as claimed in claim 1, in which the alkanolamine of constituent c) is selected from the group consisting of monoethanolamine, diethanolamine, triethanolamine, diglycolamine, monoisopropanolamine and 2-amino-2-methyl-1-propanol.

6. The emulsion concentrate as claimed in claim 1, containing
a) 1% to 50% by weight of the at least one methylglucamine of the formula (I),
b) 0.1% to 23% by weight of at least one organic acid, or salt thereof, and
c) 0.05% to 42% by weight of at least one alkanolamine of formula (III).

7. The emulsion concentrate as claimed in claim 1, further comprising, as additional component d), one or more constituents selected from the group consisting of one or more emulsifiers, one or more biocides, one or more further corrosion inhibitors, one or more AW additives, one or more EP additives, one or more defoamers, one or more antioxidants, one or more coupling agents, one or more alkali metals or alkaline earth metals, one or more solubilizers, one or more pH regulators, and water.

8. The emulsion concentrate as claimed in claim 7, comprising one or more anionic, nonionic, cationic or amphoteric emulsifiers in amounts of 0.5% to 50% by weight, based on the weight of components a) to d).

9. The emulsion concentrate as claimed in claim 7, containing 0.001% to 5% by weight of one or more biocides selected from the group consisting of boric acid, 1,2-benzisothiazol-3-(2H)-one (BIT), 3(2H)-isothiazolone, 2-methyl, methanol [1,2-ethanediylbis(oxy)bis(glyoxal monoethylene acetal)], sodium 2-pyridinethione-1-oxide (sodium pyrithione), 1,3,5-triazine-1,3,5(2H,4H,6H)-triethanol, morpholine, 4,4'-methylenebis(1H,3H,5H)oxazolo[3,4-c]oxazole, 5-ethyl-3,7-dioxa-1-azabicyclo[3.3.0]octane, and 3-iodo-2-propynyl butyl carbamate (IPBC).

10. The emulsion concentrate as claimed in claim 1, in which the cation of the salt of the at least one organic acid is selected from the group consisting of $Li^+$, $Na^+$, $K^+$, $Mg^{++}$, $Ca^{++}$, $Al^{+++}$, $NH_4^+$, monoalkylammonium, dialkylammonium, trialkylammonium and tetraalkylammonium ions, and in which the alkyl substituents of these ammonium ions are each independently ($C_1$-$C_{22}$)-alkyl radicals.

11. The emulsion concentrate as claimed in claim 10, in which the alkyl substituents bear up to three ($C_2$-$C_{10}$)-hydroxyalkyl groups.

12. The emulsion concentrate as claimed in claim 1, in which $R^1$ is an alkyl or alkenyl group.

13. The emulsion concentrate as claimed in claim 1, wherein the pH thereof is between 7 and 12.

14. The emulsion concentrate as claimed in claim 1, wherein the oil is selected from the group consisting of mineral oils having kinematic viscosities of 5 to 1000 $mm^2$/s, measured at 40° C., paraffins, isoparaffins, cycloparaffins, aromatic hydrocarbons, poly-alpha-olefins, polyalkylene glycols (PAGs) and ester oils.

\* \* \* \* \*